May 2, 1961 — G. ROSEN — 2,982,361
VARIABLE CAMBER BLADING
Filed Dec. 19, 1958 — 3 Sheets-Sheet 1

INVENTOR
GEORGE ROSEN
BY Leonard F. Weeklind
ATTORNEY

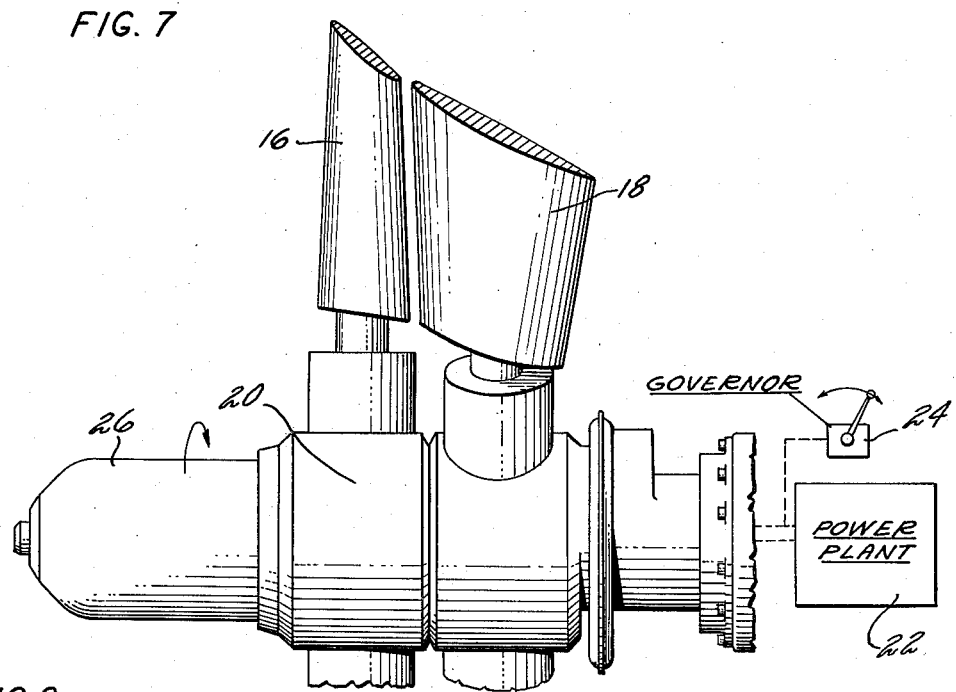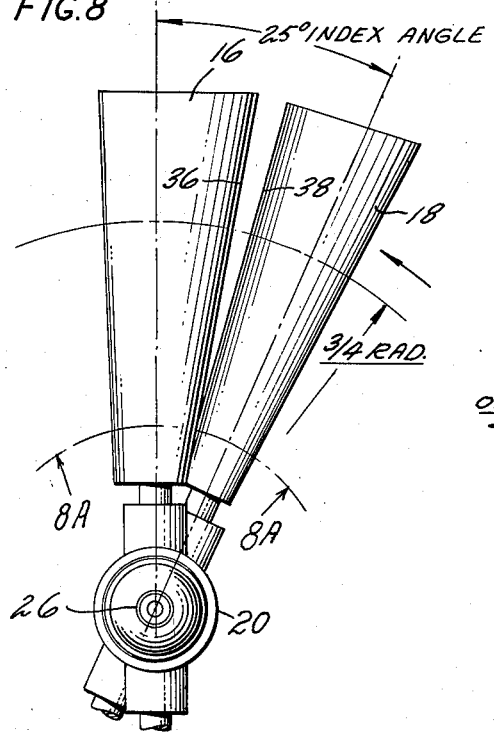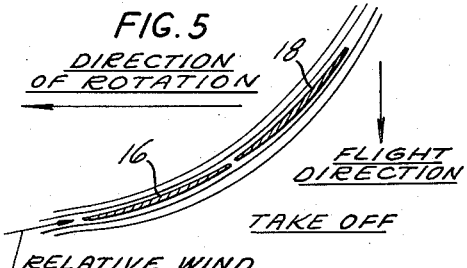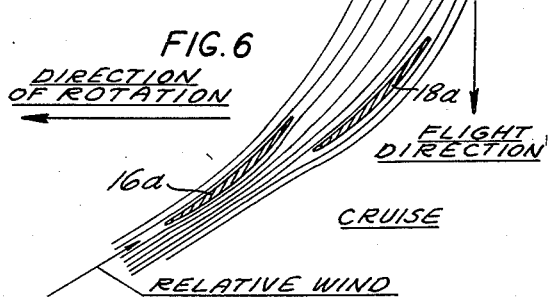
INVENTOR
GEORGE ROSEN

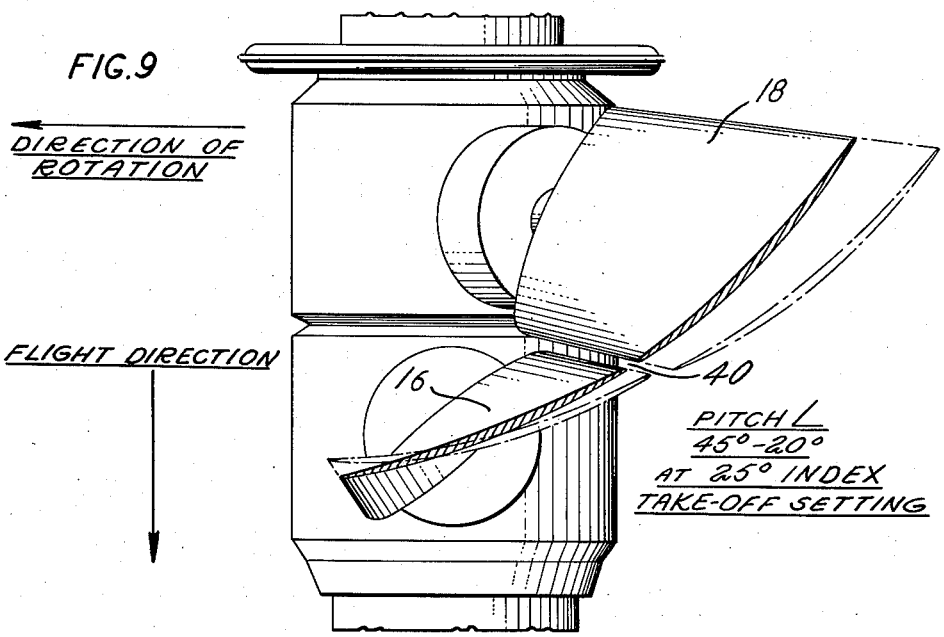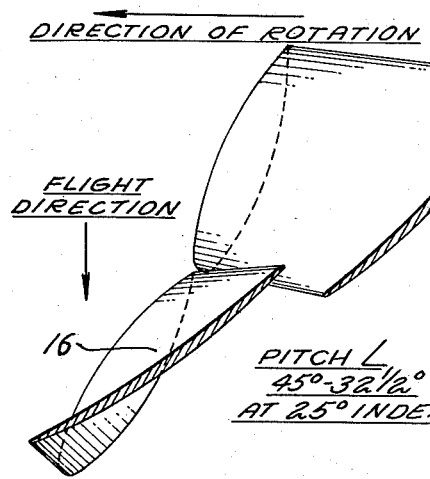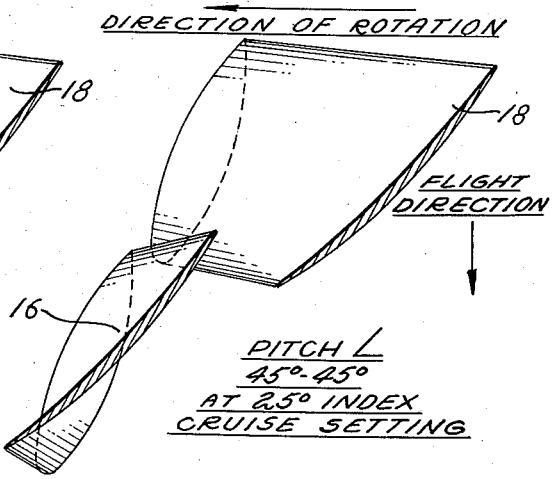

United States Patent Office 2,982,361
Patented May 2, 1961

2,982,361

VARIABLE CAMBER BLADING

George Rosen, West Hartford, Conn., assignor to United Aircraft Corporation, East Hartford, Conn., a corporation of Delaware Filed Dec. 19, 1958, Ser. No. 781,715
13 Claims. (Cl. 170—135.24)

This invention relates to aerodynamic propellers and more particularly to propellers having a variable effective camber.

The aerodynamic design of aircraft propeller blades generally involves some degree of compromise, since the blade configuration for optimum performance varies significantly from one operating condition to another. Past propeller design practice has been to tailor the blade design for near optimum performance at the most important flight condition, such as normal cruise, while attempting to minimize performance losses at off-design flight conditions and maintain minimum propeller weight. However, recent aircraft design trends have posed more stringent propeller performance requirements, such that near optimum propeller performance is required at more than one operating condition with increasing emphasis on take-off and climb performance.

Although increase in propeller diameter is most effective in providing improved take-off and climb performance, this introduces serious weight penalties and also results in too large a propeller for cruise operation with consequent significant losses in cruise efficiency. Another means of improving propeller performance in take-off and climb is to utilize blade airfoil sections of higher camber. Although this does not adversely affect propeller weight, the high-cambered blades exhibit much greater losses in cruise efficiency than those resulting from diameter increase.

It is therefore an object of this invention to provide a propeller blade arrangement whereby a high effective camber is provided for take-off conditions and a low effective camber is provided for the cruise condition.

It is a further object of this invention to provide a propeller of this type having two banks of blades with each blade of one bank cooperating with a blade of the next bank so as to form together cooperating elements of one effective airfoil for take-off and two separate airfoil elements for cruise. The effective camber can be changed by changing the relative pitch between the blades.

These and other objects of this invention will become readily apparent from the following detailed description of the drawings in which:

Figs. 5 and 6 show airfoils according to this invention and the flow thereover in the take-off and cruise positions, respectively;

Fig. 7 is a side elevation of a typical two-bank propeller according to this invention;

Fig. 8 is a front view of Fig. 7;

Fig. 8a is a section taken along the lines 8a—8a of Fig. 8;

Fig. 9 is a top view of a typical blade section indicating the take-off position of the blades;

Fig. 10 is similar to Fig. 9 but illustrates an intermediate setting of the blades; and Fig. 11 is similar to Figs. 9 and 10 indicating the cruise setting of the blades.

The basis of this invention stems from a comprehensive understanding of the nature of the blade air flow patterns for optimum propeller performance and the conception of a unique arrangement of blades which would permit the achievement of such optimum blade air flow patterns under varying flight conditions, without introducing any appreciable increase in mechanical or structural complexities beyond those of conventional, variable-pitch aircraft propellers.

Figure 1:
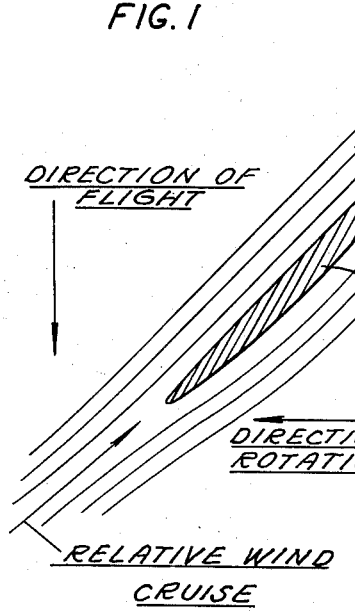
Figs. 1 and 2 are airfoil sections showing the air flow for low cambered sections in the cruise and take-off positions.
Figure 2:
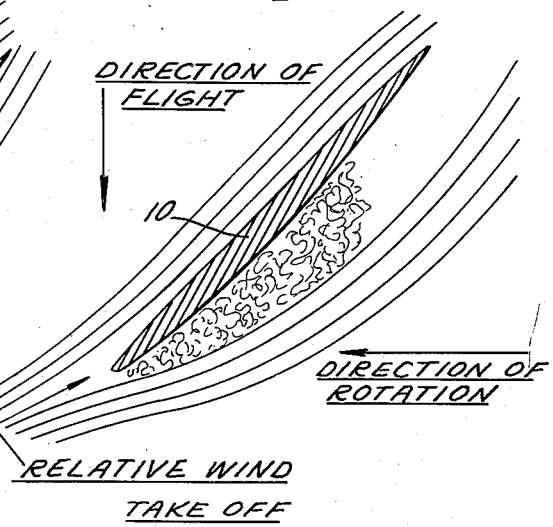

Referring to Figs. 1 and 2 the low cambered airfoil 10 is shown in the cruise and take-off positions, respectively. It is herein illustrated that the air flow patterns across a representative blade element of a conventional low cambered propeller designed for optimum cruise performance does not perform effectively at take-off. Thus, with such a design a minimum of flow disturbance and corresponding high efficiency is obtained for cruise. However, this airfoil is no longer favorably oriented to the relative wind when the pitch is adjusted to permit maximum engine output for take-off. Accordingly, the air flow across the blade elements experiences considerable disturbance with resultant poor propeller performance in take-off.

Figure 3:
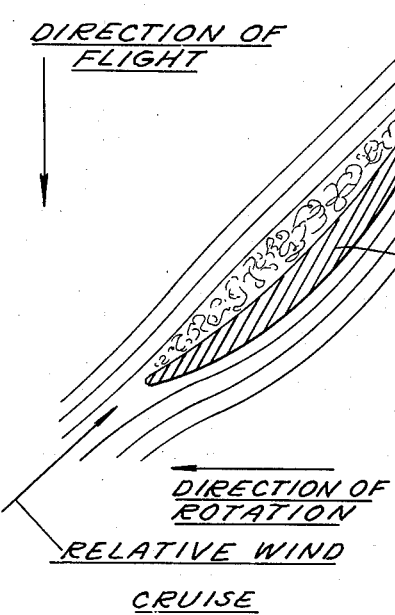
Figs. 3 and 4 are airfoil sections for a high camber airfoil in the cruise and take-off positions.
Figure 4:
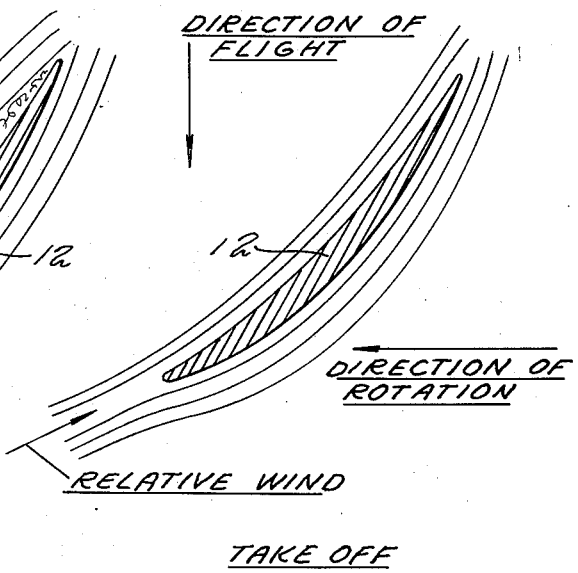

Figs. 3 and 4 illustrate a means for alleviating this take-off performance deficiency by utilizing high cambered blades 12. It is a quite generally accepted aerodynamic principle that the high cambered airfoil can produce a large turning of the air flow, and consequent high lift, with a minimum of flow disturbance. Conversely, however, the high cambered blade configuration is less favorable for the low lift requirement at cruise where it is characterized by greater flow disturbance.

The present invention relates to a unique arrangement of blades in an aircraft propeller such that automatic variation of effective camber of the blade airfoils is achieved by and simultaneous with the normal blade pitch variation associated with maintaining constant propeller speed under varying aircraft flight conditions. Thus, this invention is compatible with any type of electrical, hydraulic or mechanical mechanisms such as are utilized to achieve constant speed variable pitch operation in conventional aircraft propellers.

This invention requires a change from the conventional equally spaced, coplanar arrangement of blades to one with at least two banks of blades and a relative angular indexing of blades between banks such that there is an optimum alignment of blades in cruise represented by the pairing of one blade from one bank with a corresponding cooperating blade in the next bank.

Thus, referring to Fig. 5, for example, according to this invention a blade 16 of one bank cooperates with a rear blade 18 of the rear bank. At take-off position the blades 16 and 18 present to the oncoming airstream a substantially continuous airfoil having a relatively high effective camber. The airfoil 18 is at a higher angle relative to the plane of rotation than the airfoil 16. Therefore, the airfoil 18 will be turning the air an increased amount over that caused by the airfoil 16. Were the airfoil 18 operating independently at this higher pitch setting, it would experience too large an angle of attack of the airstream with consequent separation of flow and poor performance. However, the turning of the air by the upstream airfoil 16 is sufficient to align the air efficiently with the airfoil 18. Thus, in the takeoff position the airfoils 16 and 18 together form a streamlined body of relatively high camber. In a typical embodiment of this invention the airfoil 18 is fixed while the airfoil 16 is of variable pitch. If the high cambered combined airfoil unit 16, 18 is presented to the oncoming airstream during high forward flight speeds as in the cruise condition, the drag of this unit would be excessive.

Therefore, as shown in Fig. 6 the airfoil 16a has the pitch thereof varied to a higher pitch position such that its chord forms an angle with the plane of rotation which is substantially identical with or slightly lower than the angle which is formed by the chord of airfoil 18a with the plane of rotation. The determination of the optimum relative pitch setting for the cruise condition is dependent on the amount of airfoil camber incorporating in the individual blades, such that increased airfoil camber will require increased difference in pitch setting between the banks of blades. In this position the chords of the airfoils 16a and 18a are substantially parallel and at substantially the same angle relative to the plane of rotation. In this position the air flow of the forward airfoil 16a is not sufficiently affected so as to disturb the flow approaching the airfoil 18a. In this position airfoils 16a and 18a act like a pair of separate air foils having low camber and a relatively high pitch angle. It is thus evident that the drag at cruise will be substantially lower than a high cambered airfoil while at take-off the added lift of an effectively high cambered airfoil is obtained.

A typical embodiment of this invention is illustrated in Fig. 7. As shown herein the propeller includes a hub unit 20 carrying two banks of blades 16 and 18 with the blades of one bank being immediately behind the blades of the other bank. As shown herein, a power plant 22 may drive the propeller about its axis of rotation and a governor 24, as well known in the art, may control a pitch changing mechanism in the dome 26. The pitch changing mechanism in the dome 26 in this embodiment is intended to vary the pitch only of the front bank which includes the blades 16. The blades 18 are fixed at a relatively high positive pitch which corresponds to the cruise pitch position for the aircraft.

The alignment of these blades is more clearly shown in Figs. 9 through 11.

As seen in Figs. 8 and 8a the blades of one bank are indexed about the axis of rotation relative to the blades of another bank a predetermined amount. As shown, the index angle is formed by lines representing the pitch changing axes of the blades. Thus, the indexing angle between adjacent blades will not exceed approximately 35°. Outside of this range the effect of one blade will not be sufficient to significantly vary the flow over the next adjacent blade. This indexing is further dependent upon the blade twist and the fore and aft spacing of each of the banks of blades. Blade twist may be defined as a continuous decrease in pitch of each blade between the inboard and outboard end.

Further, as seen in Figs. 8 and 8a, the trailing edge 36 of the blade 16 and the leading edge 38 of the blade 18 are extended in an aft and fore direction respectively so that in at least one pitch position of the blades the trailing edge of the forward blade and the leading edge of the aft blade are in close proximity. This condition is usually the take-off position when the effective camber of the combined blades is relatively high. In this instance it is desired to obtain a smooth turning of the air by the combination of both the blades.

As seen in Fig. 9 to illustrate a typical case, the blade 16 is set approximately at an angle of 20° relative to the plane of rotation while the blade 18 is fixed at 45°, and with an indexing angle between adjacent blades of 25°, the effective camber of the combined blades 16 and 18 is relatively large. This provides high camber and high lift for the slow forward speeds and high thrust during take-off. It will be noted here that the gap 40 between the blades 16 and 18 remains substantially small and constant throughout the span of the blades. In this figure the gap appears to be tapered somewhat but this appearance results from the twist of the blade.

Fig. 10 is similar to Fig. 9 but shows the blades 16 and 18 in an intermediate position between the take-off and the cruise. Accordingly, this arrangement of blades will result in a somewhat reduced effectiveness of the cooperating effect of each pair of blades as compared to that in the take-off condition. Thus, the resulting intermediate level of effective camber would be consistent with the requirement for a continuously decreased level of effective camber between take-off and cruise.

In Fig. 11 the blade 16 has now been moved for example to the 45° pitch position so that it is at substantially the same relative angle with the plane of rotation as is the airfoil 18. In this position of the blades the free stream can flow individually over each of the blades 16 and 18 without the flow from the front blade 16 significantly altering the flow over the rear blade 18.

The governor 24 shown in Fig. 7 can vary the pitch of the blade 16 as any normal speed governor does. At low forward speeds during take-off the pitch of the blades 16 would be moved to about the 20° setting and the combination of the blades 16 and 18 would present a unitary high cambered airfoil section to the oncoming stream. This will produce the necessary high thrust at the low forward speeds. As the speed is increased up until the cruise condition the governor 24 will vary the pitch of the blade 16 such that it will assume the cruise condition (see Figs. 6 and 11) wherein each of the blades 16 and 18 act as individual blade elements in the free airstream.

As a result of this invention a highly efficient propeller combination has been provided which will provide high thrust and low drag at low forward speeds as well as good efficiency at high forward speeds. During take-off a very efficient high thrust producing arrangement is provided while in the cruise condition a low drag efficient arrangement of the blades is presented to the oncoming airstream.

Furthermore, with a speed governor operating on the forward set of blades this novel device provides an automatic variation in camber of a blade array with changes in speed.

Although only one embodiment of this invention has been illustrated and described herein, it will be apparent that various changes may be made in the construction and arrangement of the various parts without departing from the scope of the novel concept.

What it is desired by Letters Patent is:

1. A propeller having an axis of rotation and including two banks of blades with the blades in each bank being similar in length, hub means for mounting said blades, each of said banks including a like number of blades, said blades having twist, the blades of both banks being driven at the same speed in the same direction, the blades of one bank being angularly indexed about the axis of rotation relative to the blades of the other bank such that the pitch changing axes of blades in one bank form acute angles with the corresponding axes of the blades in the other bank, and means for varying the pitch of the blades of one bank relative to the pitch of the other bank.

2. In a propeller having a plurality of banks of blades, an axis of rotation, means for mounting the blades for simultaneous rotation about said axis in the same direction and at the same speed, each of said blades having twist, the blades of one bank having corresponding cooperating blades in the other bank which cooperating blades as a pair form a continuous airfoil having an effective camber, the blades of one bank having their pitch-changing axes indexed about said axis relative to the cooperating blades of the other bank so as to form an acute angle therebetween, means for varying the pitch of the blades of one of said banks relative to the pitch of the blades of the other of said banks thereby to vary the effective camber of each pair of cooperating blades, the trailing edge of the forward blade and the leading edge of the aft blade of said cooperating blades being tapered in plan form such that in at least one pitch position they remain adjacent each other throughout their length.

3. In an aeronautical propeller having an axis of rotation, a hub, a plurality of blades radially extending from said hub, each of said blades having twist, said blades including two banks in tandem, and one bank of blades being located immediately adjacent respective blades of the other bank, said blades normally being at an angle of attack relative to the oncoming stream, the blades of one bank being angularly indexed about the axis of rotation relative to the cooperating blades of the other bank, said blades being so aligned that the trailing edge of the forward blade is located adjacent the leading edge of the aft blade in at least one pitch position of the blades, and means for varying the pitch of the blades in one bank relative to the pitch of the blades in the other bank to vary the effective camber of the combined array of blades of both banks.

4. In a propeller having a plurality of banks of blades, an axis of rotation, means for mounting the blades for simultaneous rotation about said axis in the same direction and at the same speed, said blades having twist, the blades of one bank having corresponding cooperating blades in the other bank which cooperating blades as a pair form an effective continuous airfoil having an effective camber, the blades of one bank being indexed about said axis so that the pitch-change axes of the cooperating blades form an acute angle, means for varying the pitch of the blades of one of said banks relative to the pitch of the blades of the other of said banks thereby to vary the effective camber of each pair of cooperating blades.

5. A propeller having an axis of rotation and including two banks of blades with the blades in each bank having twist, hub means for mounting said blades, each of said banks including a like number of blades, the blades of both banks being driven at the same speed in the same direction, the blades of one bank being angularly indexed about the axis of rotation relative to the blades of the other bank such that the pitch-changing axes of adjacent blades in each bank form acute angles with each other, and adjacent blades form cooperating airfoils having an effective camber, means for varying the pitch of the blades of one of said banks, and means for automatically varying the effective camber of said cooperating airfoils including speed responsive means for controlling said pitch varying means.

6. In an aeronautical propeller having an axis of rotation, said propeller including at least two propeller blade units extending radially from said axis, said blades having twist, each unit rotatable in the same direction about said axis and comprising two blades located one substantially immediately behind the other, the blades of one unit being angularly indexed about the axis of rotation relative to the cooperating blades of the other unit, means for adjusting the pitch of one of said two blades of each unit to vary the effective camber of each unit, the trailing edge of the front blade being located adjacent the leading edge of the rear blade in the high camber position and the chord of one blade being at a higher angle relative to said axis than the chord of the other blade thereby forming a high camber substantially continuous airfoil unit, and the chords of said blades being substantially at the same angle relative to said axis in the low camber position of each of said units.

7. In an aeronautical propeller having an axis of rotation, said propeller including at least two propeller blade units extending radially from said axis, each of said blades having twist, each unit rotatable in the same direction about said axis and comprising front and rear blades located one substantially immediately behind the other, the blades of one unit being angularly indexed about the axis of rotation relative to the cooperating blade of the other unit, means for adjusting the pitch of one of said two blades to vary the effective camber of each unit, the trailing edge of the front blade being located adjacent the leading edge of the rear blade in the high camber position and the chord of the front blade being at a higher angle relative to said axis than the chord of the rear blade, and the chords of said blades being substantially parallel to each other in the low camber position of said units.

8. In an aeronautical propeller having an axis of rotation, said propeller including at least two propeller units, each unit rotatable in the same direction about said axis comprising front and rear blades located one substantially immediately behind the other but indexed at an angle relative to each other about said axis, said angle ranging below 35°, each of said blades having a twist from shank to tip, means for adjusting the pitch of the front blade only to vary the effective camber of each unit, the rear blade being fixed in pitch, the trailing edge of the front blade being located adjacent the leading edge of the rear blade in the high camber position and the chord of the front blade being at a higher angle relative to said axis than the chord of the rear blade, and the chords of said blades being substantially at the same angle relative to said axis in the low camber position of each of said units.

9. In an aeronautical propeller having an axis of rotation, a hub, a plurality of blade units extending from said hub, each of said blades having twist, each said blade unit comprising cooperating fore and aft blade elements, the fore blade element of one unit being angularly indexed about the axis of rotation with respect to the cooperating aft blade element of the other unit, means for varying the pitch of one of said blade elements with respect to the other blade element of each unit, said one blade element being movable to a relatively high angle with respect to said axis thereby forming effectively with the other blade element a substantially high cambered airfoil and also being movable to a position whereby the chords of the two elements are substantially at the same angle with respect to said axis thereby together forming a low cambered airfoil.

10. In an aeronautical propeller having an axis of rotation, a plurality of blade units rotatable simultaneously in the same direction about said axis, each said blade unit comprising cooperating fore and aft blade elements, the fore blade element of one unit being angularly indexed about the axis of rotation with respect to the cooperating aft blade element of the other unit, each of said blade elements having a twist, means for varying the pitch of said forward blade element with respect to the aft blade element of each unit, said forward blade element being movable to a relatively high angle with respect to said axis thereby forming effectively with the aft blade element a substantially high cambered airfoil, and said forward blade element also being movable to a position whereby the chords of the two elements are substantially at the same angle with respect to said axis thereby together forming a low cambered airfoil.

11. An aeronautical propeller including hub means having an axis of rotation, front and rear sets of blades of substantially the same diameter mounted in said hub means for simultaneous rotation in the same direction and at the same speed, each of said blades decreasing in pitch throughout its length in a spanwise direction to provide twist, the blades of each set being mounted behind cooperating blades of the other set, said cooperating blades being indexed about said axis of rotation so that their longitudinal axes form a fixed acute angle, said rear set normally having the blades thereof at an angle with respect to said axis which represents the cruise condition of flight, said front set of blades being mounted for variable pitch, means for varying the pitch of said front set of blades relative to the rear set of blades whereby in the take-off condition the chord of the front cooperating blade is at a higher angle with respect to said axis than the rear cooperating blade to form with the rear cooperating blade a substantially continuous airfoil of over-all relatively high camber, and said cooperating blades in the cruise condition having their respective chords at substantially the same angle relative to said axis thereby forming separate airfoils having relatively low camber and chords substantially parallel and spaced around said axis.

12. An aeronautical propeller including hub means having an axis of rotation, front and rear sets of blades of substantially the same diameter mounted in said hub means for simultaneous rotation in the same direction and at the same speed, each of said blades having a twist, one of said sets of blades being mounted immediately behind the other, each of the blades of the front set having a corresponding cooperating blade in the rear set, said cooperating blades being indexed about said axis of rotation so that their longitudinal axes form a fixed acute angle which can range below 35°, said front set of blades being mounted for variable pitch, means for varying the pitch of said front set of blades whereby in the take-off condition the chord of the front cooperating blade is at a higher angle with respect to said axis than the rear cooperating blade but at a lesser angle of attack with respect to the relative air to form with the rear cooperating blade a substantially continuous airfoil of over-all relatively high camber, and said cooperating blades in the cruise condition having their respective chords at substantially the same angle relative to said axis thereby forming separate airfoils having relatively low camber and chords substantially parallel to each other and spaced around said axis.

13. An aeronautical propeller including hub means having an axis of rotation, front and rear sets of blades of substantially the same diameter mounted in said hub means for simultaneous rotation in the same direction and at the same speed, each of said blades having twist, one of said sets of blades being mounted immediately behind the other, each of the blades of the front set having a corresponding cooperating blade in the rear set, said cooperating blades being indexed about said axis of rotation so that their longitudinal axes form a fixed acute angle which can range below 35°, said rear set having the blades thereof fixed in pitch at an angle with respect to said axis which represents the cruise condition of flight, said front set of blades being mounted for variable pitch, means for varying the pitch of said front set of blades whereby in the take-off condition the chord of the front cooperating blade is at a higher angle with respect to said axis than the rear cooperating blade but at a lesser angle of attack with respect to the relative air to form with the rear cooperating blade a substantially continuous airfoil of over-all relatively high camber, and said cooperating blades in the cruise condition having their respective chords at substantially the same angle relative to said axis thereby forming separate airfoils having relatively low camber and chords substantially parallel to each other and spaced around said axis, and means responsive to the speed of rotation of the propeller for automatically controlling said pitch varying means.

References Cited in the file of this patent
FOREIGN PATENTS

| | | |
|---|---|---|
| 900,353 | France | Sept. 25, 1944 |
| 980,312 | France | Dec. 27, 1950 |
| 1,010,026 | France | Mar. 12, 1952 |